(12) United States Patent
Numazawa et al.

(10) Patent No.: US 10,970,359 B2
(45) Date of Patent: Apr. 6, 2021

(54) WEB PAGE DISTRIBUTING SERVER, WEB PAGE DISTRIBUTING METHOD, AND STORAGE MEDIUM

(71) Applicant: Rakuten, Inc., Tokyo (JP)

(72) Inventors: Jun Numazawa, Tokyo (JP); Tenshin Hayashi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 9 days.

(21) Appl. No.: 16/451,194

(22) Filed: Jun. 25, 2019

(65) Prior Publication Data

US 2019/0317971 A1 Oct. 17, 2019

Related U.S. Application Data

(63) Continuation of application No. PCT/JP2017/004050, filed on Feb. 3, 2017.

(51) Int. Cl.
*H04L 29/08* (2006.01)
*G06F 16/958* (2019.01)
*G06F 3/0483* (2013.01)
*G06F 3/0485* (2013.01)

(52) U.S. Cl.
CPC .......... *G06F 16/958* (2019.01); *G06F 3/0483* (2013.01); *G06F 3/0485* (2013.01)

(58) Field of Classification Search
CPC .................................................. G06F 16/958
See application file for complete search history.

(56) References Cited

U.S. PATENT DOCUMENTS

| 10,600,089 B2* | 3/2020 | Fichter ............... G06Q 30/0277 |
| 10,606,452 B2* | 3/2020 | Lin-Hendel ............. G06F 16/95 |
| 10,613,731 B2* | 4/2020 | Jeon ...................... G06F 16/958 |
| 2009/0106687 A1 | 4/2009 | De Souza Sana et al. |

FOREIGN PATENT DOCUMENTS

| JP | 2011-501299 A | 1/2011 |
| JP | 2016-033790 A | 3/2016 |
| WO | 2009/052033 A2 | 4/2009 |

OTHER PUBLICATIONS

International Search Report for PCT/JP2017/004050 dated Feb. 28, 2017.

* cited by examiner

*Primary Examiner* — Adnan M Mirza
(74) *Attorney, Agent, or Firm* — Sughrue Mion, PLLC

(57) ABSTRACT

A web page distributing server receives a transmission request for a web page from a terminal device, and transmits, to the terminal device, web page data to display the entire web page in response to the transmission request. The web page distributing server transmits, to the terminal device, a program that causes the terminal device to achieve a completion determination function to determine whether or not a browser of the terminal device has completed reading of data necessary to display a position containing a specific part in the web page and an intermediate movement function to move a position of a browser screen to a specific scroll position which is a position where the specific part is contained in the browser screen in response to the determination by the completion determination function that the reading has been completed.

15 Claims, 12 Drawing Sheets

FIG. 2

- P0 — XXXX QUESTIONNAIRE SURVEY
- P1 — Q1. YOUR GENDER?
- P2 — Q2. YOUR AGE?
- P3 — Q3. YOUR PROFESSION?

- P49 — Q49. SELECT FROM THE FOLLOWINGS THAT MATCH XXXX
  - ○ ×△□
  - ××△○
  - △△○○
  - ○○□△

- P50 — Q50. WHERE DID YOU KNOW XXXX?
  - ×△×○
  - △△××
  - ×××○
  - ○○○□
  - □○○×

Wp

WEB PAGE DISTRIBUTING SERVER, WEB PAGE DISTRIBUTING METHOD, AND STORAGE MEDIUM

CROSS REFERENCE TO RELATED APPLICATIONS

This application is a Bypass Continuation of International Application No. PCT/JP2017/004050 filed Feb. 3, 2017.

TECHNICAL FIELD

The present disclosure relates to an information processing device, an information processing method, a computer-readable program, and a storage medium storing the program, and more specifically, to a technical field to promptly present a specific part in a web page to a user.

BACKGROUND ART

Link functions of a web page involve a display transition to the header part of a linked page, and a display transition to a specific part other than the header part of the page. According to conventional technologies, when a transition is made to the specific part of a page, a browser screen is located to the header part of the page immediately after the page transition, the display of the part having undergone completion of reading in sequence from the header part of the page is started, and then the browser screen is transitioned to the location where the specific part can be displayed upon completion of reading of the entire page, and thus the specific part is presented to a user.

In this case, when the display transitions to the specific part of a linked page, there is a case such that all pieces of information contained in the page should be transmitted.

In the case of, for example, an answer page for a questionnaire survey, if only a part is confirmed, the reliability of the answer details decreases, and in the case of, for example, an application page for a credit card, all fields are provided in an editable manner and require inputting, and input details must be checked. Moreover, in the case of, for example, a listing page of various terms and conditions, if only a part is presented, a misunderstanding may occur.

Relevant conventional technologies are disclosed in the following Patent Literatures 1 and 2.

CITATION LIST

Patent Literatures

Patent Literature 1: JP 2016-33790 A
Patent Literature 2: JP 2011-501299 A

SUMMARY OF INVENTION

Technical Problem

As for a web page that is presumed to transmit information on the entire page as described above, a scheme of partially transmitting data on only the specific part to accelerate a presentation is not applicable.

Conversely, if the entire page is read and then the specific part is displayed like the above conventional scheme, it is difficult to promptly present the specific part since a time for reading the entire page is necessary.

The present disclosure has been made in view of the foregoing circumstances, and an objective is to promptly present a specific part to a user when the user wants to browse the specific part of a web page for which transmission of the entire web page is presumed.

Solution to Problem

An information processing device according to the present disclosure includes: a request receiving unit that receives a transmission request for a web page from a terminal device; and a page data transmitting unit that transmits, to the terminal device, web page data to display the entire web page in response to the transmission request.

Moreover, the page data transmitting unit transmits the web page data containing a program that causes the terminal device to achieve: a completion determination function to determine whether or not reading of predetermined data necessary to display up to a specific part in the web page has been completed after a browser of the terminal device starts reading the web page data; and an intermediate movement function to move a position of a browser screen to a specific scroll position which is a position where the specific part is contained in the browser screen in response to the determination by the completion determination function that the reading has been completed.

Accordingly, even if the transmission of the entire web page is premised, before the reading of the entire web page data completes, the specific part can be displayed in the browser screen.

In the above-described information processing device according to the present disclosure, the page data transmitting unit may transmit the web page data that contains the program which causes the terminal device to achieve: a reading time estimation function to estimate a page reading time which is a time necessary until the reading of the entire web page is completed; an intermediate movement permission function to permit the movement to the specific scroll position by the intermediate movement function when the page reading time is estimated as being equal to or longer than a predetermined time; and an intermediate movement prohibition function to prohibit the movement to the specific scroll position by the intermediate movement function when the page reading time is estimated as being less than the predetermined time, and to execute the movement to the specific scroll position after the reading of the entire web page completes.

When the time necessary to read the entire page is long such that the communication environment is inadequate or the page data quantity is large, the difference in time until the specific part is presented is likely to be created between the case in which the intermediate movement is executed and the case in which the intermediate movement is not executed. In such a case, the intermediate movement is executed to enable the prompt presentation of the specific part to the user.

In contrast, when the time necessary to read the entire page is short such that the communication environment is adequate or the page data quantity is little, the difference in time until the specific part is presented is not likely to be created between the case in which the intermediate movement is executed by the intermediate movement function and the case in which the intermediate movement is not executed. Hence, in such a case, the intermediate movement is not executed to simplify the process by the terminal device, thereby reducing a process load.

In the above-described information processing device according to the present disclosure, when an image is contained in a part located at a page-header side beyond the specific part in the web page, the page data transmitting unit may transmit the web page data that contains the program which causes the terminal device to achieve an image later reading function to execute a reading of the image after the movement to the specific scroll position by the intermediate movement function.

By postponing the reading of the image located at the page-header side beyond the specific part, a reduction in time that needs to complete the reading up to the specific part is accomplished.

In the above-described information processing device according to the present disclosure, the web page may be information input page for a user to input information for a plurality of fields; and the specific part may be a display part of a specific field in the information input page.

This reduces a waiting time of the user in the information input page.

In the above-described information processing device according to the present disclosure, the specific field may be a field specified by the terminal device based on information input details in the information input page that is different from the information input page that contains the specific field.

Hence, when the fields subjected to input by the user are provided across the plurality of pages, the waiting time for the user during the information input is reduced.

In the above-described information processing device according to the present disclosure, the transmission request may contain a display request for the specific part in the web page.

In this case, the information processing device transmits, to the terminal device, the web page data that contains the program to achieve the completion determination function and the intermediate movement function in response to the transmission request for the web page containing the display request for the specific part.

An information processing method according to the present disclosure causes an information processing device to execute: a request receiving step of receiving a transmission request for a web page from a terminal device; and a page data transmitting step of transmitting, to the terminal device, web page data to display the entire web page in response to the transmission request, in which in the page data transmitting step, the web page data is transmitted that contains a program that causes the terminal device to achieve: a completion determination function to determine whether or not reading of predetermined data necessary to display up to a specific part in the web page has been completed after a browser of the terminal device starts reading the web page data; and an intermediate movement function to move a position of a browser screen to a specific scroll position which is a position where the specific part is contained in the browser screen in response to the determination by the completion determination function that the reading has been completed.

According to such an information processing method, the same effects as those of the above-described information processing device according to the present disclosure can be accomplished.

Moreover, a first program according to the present disclosure causes a computer device to execute the process relating to the above-described information processing method.

Furthermore, a first storage medium according to the present disclosure is a computer-readable storage medium that stores therein the above-described first program. The above-described information processing device is accomplished by those program and storage medium.

Further, second program according to the present disclosure is a computer-readable program that causes a computer device to achieve: a completion determination function to determine whether or not reading of predetermined data necessary to display up to a specific part in a web page has been completed after a browser starts reading web page data to display the entire web page; and an intermediate movement function to move a position of a browser screen to a specific scroll position that is a position where the specific part is contained in the browser screen in accordance with the determination by the completion determination function that the reading has been completed.

Moreover, a second storage medium according to the present disclosure is a computer-readable storage medium that stores therein the above-described second program. The terminal device according to the present disclosure is accomplished by those program and storage medium.

Advantageous Effects of Invention

According to the present disclosure, when a user wants to browse a specific part of a web page for which transmission of the entire web page is presumed, the specific part can be promptly presented to the user.

BRIEF DESCRIPTION OF DRAWINGS

FIG. 2 is a diagram illustrating an example web page that is a questionnaire survey answer page;

DESCRIPTION OF EMBODIMENTS

Embodiments of the present disclosure will be described in the following sequence.

<1. First Embodiment>
[1-1. Outline of Network System]
[1-2. Hardware Configuration of Computer Device]
[1-3. Page Display Method according to First Embodiment]
[1-4. Process Procedure]
[1-5. Summary of First Embodiment]
<2. Second Embodiment>
[2-1. Page Display Scheme according to Second Embodiment]
[2-2. Process Procedure]
[2-3. Summary of Second Embodiment]
<3. Third Embodiment>
[3-1. Page Display Scheme according to Third Embodiment]
[3-2. Process Procedure]
[3-3. Summary of Third Embodiment]
<4. Fourth Embodiment>
[4-1. Page Display Method according to Fourth Embodiment]
<5. Program and Storage Medium>
<6. Modified Examples>

1. First Embodiment

[1-1. Outline of Network System]

Figure 1:
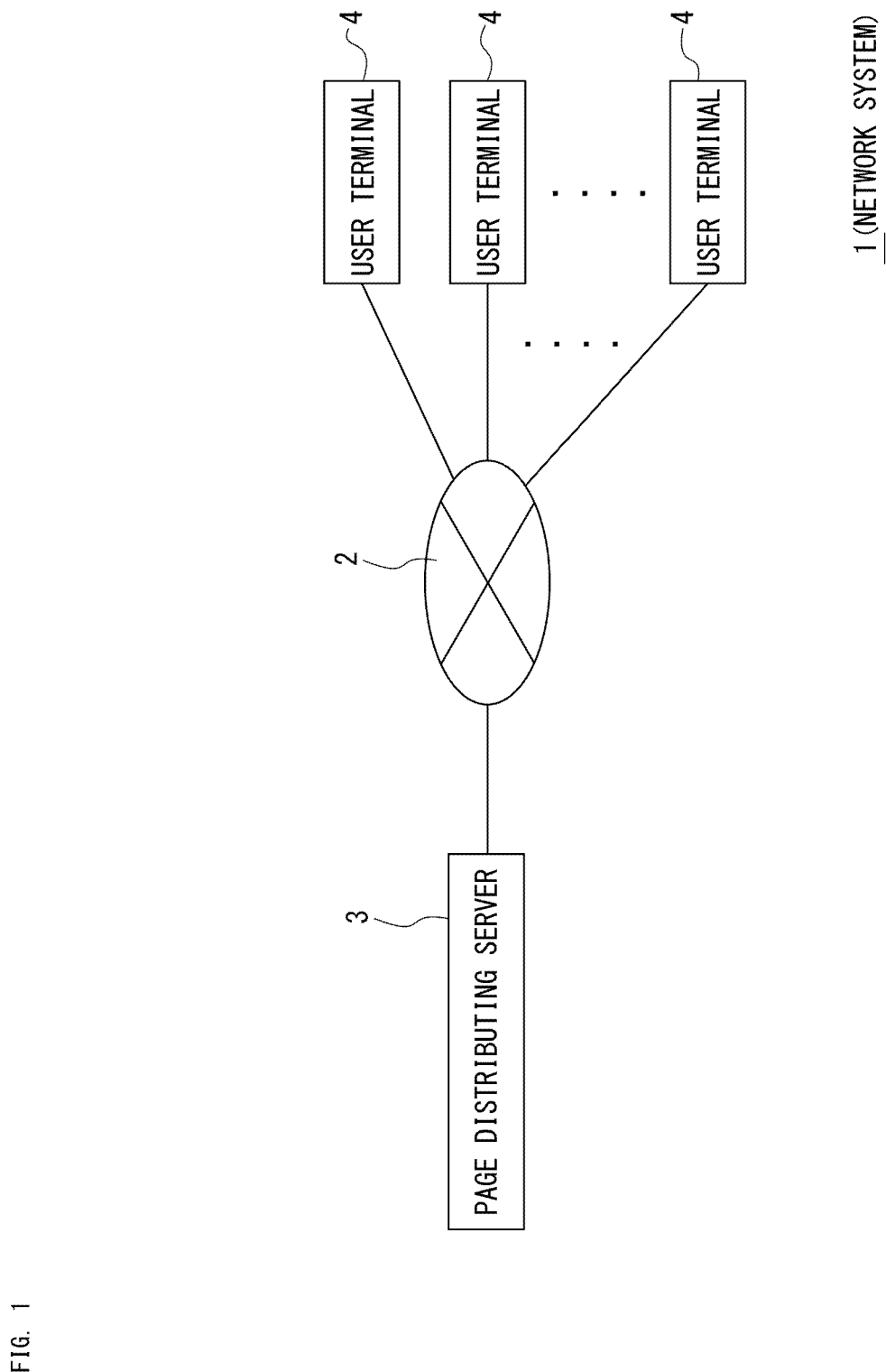
FIG. 1 is a diagram illustrating an example network system according to an embodiment of the present disclosure.

FIG. 1 illustrates an example network system 1 assumed in this embodiment.

A network system 1 includes a page distributing server 3 that functions as a distributing server of web pages, and a plurality of user terminals 4. In the network system 1, the page distributing server 3 and each user terminal 4 are communicable with each other via the network 2 that is, for example, the Internet.

The user terminal 4 is a computer device that has a browser (web browser). Example user terminals 4 are a highly functional mobile phone (smart phone), a mobile phone, a portable information terminal (tablet computer device), and a portable or a stationary personal computer device (PC), but the type of the user terminal 4 is not limited to these examples.

The user terminal 4 transmits a Hypertext Transfer Protocol (HTTP) request to the page distributing server 3, thereby requesting a web page and a predetermined process. Moreover, the user terminal 4 receives web page data (including, e.g., HyperText Markup Language (HTML) data and Extensible Markup Language (XML) data) transmitted in response to the HTTP request, and executes a web-page display process by the browser based on such web page data. This enables a user to browse or operate a desired web page.

The page distributing server 3 is a computer device, and transmits, in response to a transmission request for a web page Wp from the user terminal 4, web page data for displaying the web page Wp.

In this embodiment, the web page distributed by the page distributing server 3 is an information input page to allow the user to input information for a plurality of fields. More specifically, according to this example, it is a questionnaire survey answer page for allowing the user to input answer information for a questionnaire survey.

Other example information input pages are pages for inputting necessary information for various applications, like an application page for a credit card.

FIG. 2 illustrates an example web page Wp that is a questionnaire survey answer page.

According to the web page Wp in this case, a plurality of question portions is arranged from the header of the page toward the end thereof, and in each question portion, the details of a question are expressed by, for example, texts, and an input portion for an answer to the question is provided. In the web page Wp, each question portion is formed as a part P. Note that the term "part" described in this specification means a portion divided by, for example, tags in the HTML.

In this example, the number of arranged question portions in the single web page Wp is set to be 50. In the illustrated example, one part P ("part P0" in the figure) other than the question portions is arranged at the header part of the page, and the number of the parts P in the web page Wp is a total of 51 that includes the part P0 and the parts P1 to P50 of the respective question portions.

In this example, the questionnaire survey using the web page Wp is a questionnaire survey for members of a predetermined website.

Although the user registers, for example, user attribute information, such as an own name, a gender, a birth date, an address, and a telephone number, as membership registration information, when the membership registration is executed, according to the network system 1 of this example, when the user visits the web page Wp in a state being logged in to the predetermined website by the own membership ID, an automatic input service of answer information is available for the user regarding the questions that ask the user attribute information, such as a gender, an age, and a residential location, among the questions of the questionnaire survey.

When, for example, a first question Q1 to a question Q5 in the web page Wp are the questions that ask the user attribute information, as for these questions Q1 to Q5, the answer details are automatically input based on the registration information of the user.

In this case, since it is not necessary for the user to input the answers for the questions Q1 to Q5, after the transition to the web page Wp, the position of the browser screen is moved in such a way that the question Q6 is displayed in the browser screen in order to enable the user to promptly answer from the question Q6.

Note that the position of the browser screen immediately after the transition to the web page Wp is set to be the header position of the page.

In this case, according to this example, a plurality of questions subjected to the automatic input is continuously arranged in the header part of the web page Wp.

Information for notifying the user terminal 4 of the question portion (the question Q6 in the above example) located next to the question portion subjected to the automatic input is set for the web page Wp as "specific part notification information I1", and the specific part notification information I1 is transmitted to, in response to the transmission request for the web page Wp from the user terminal 4, the user terminal 4 by the page distributing server 3 as a part of the web page data.

Although the page distributing server 3 transmits the web page data for displaying the web page Wp which is the web page data containing a program for achieving the display from the specific part in the page as described above, the details of the program will be described later.

Note that in FIG. 1, as for the structure of the network 2, various examples are assumable. For example, the Internet, an intranet, an extra network, a Local Area Network (LAN), a Community Antenna TeleVision (CATV) communication network, a Virtual Private Network (VPN), a telephone-line network, a mobile communications network, a satellite communication network, etc., are assumable.

Moreover, various examples are also assumable for the transmission media that form the entire network 2 or a part thereof. For example, wired schemes, such as the Institute of Electrical and Electronics Engineers (IEEE) 1394, a Universal Serial Bus (USB) power line transmission, and a telephone line, or wireless schemes, such as infrared ray like the Infrared Data Association (IrDA), the Bluetooth (registered trademark), the 802.11 wireless communication, a mobile phone network, a satellite connection, and a terrestrial digital network, are applicable.

[1-2. Hardware Configuration of Computer Device]

Figure 3:
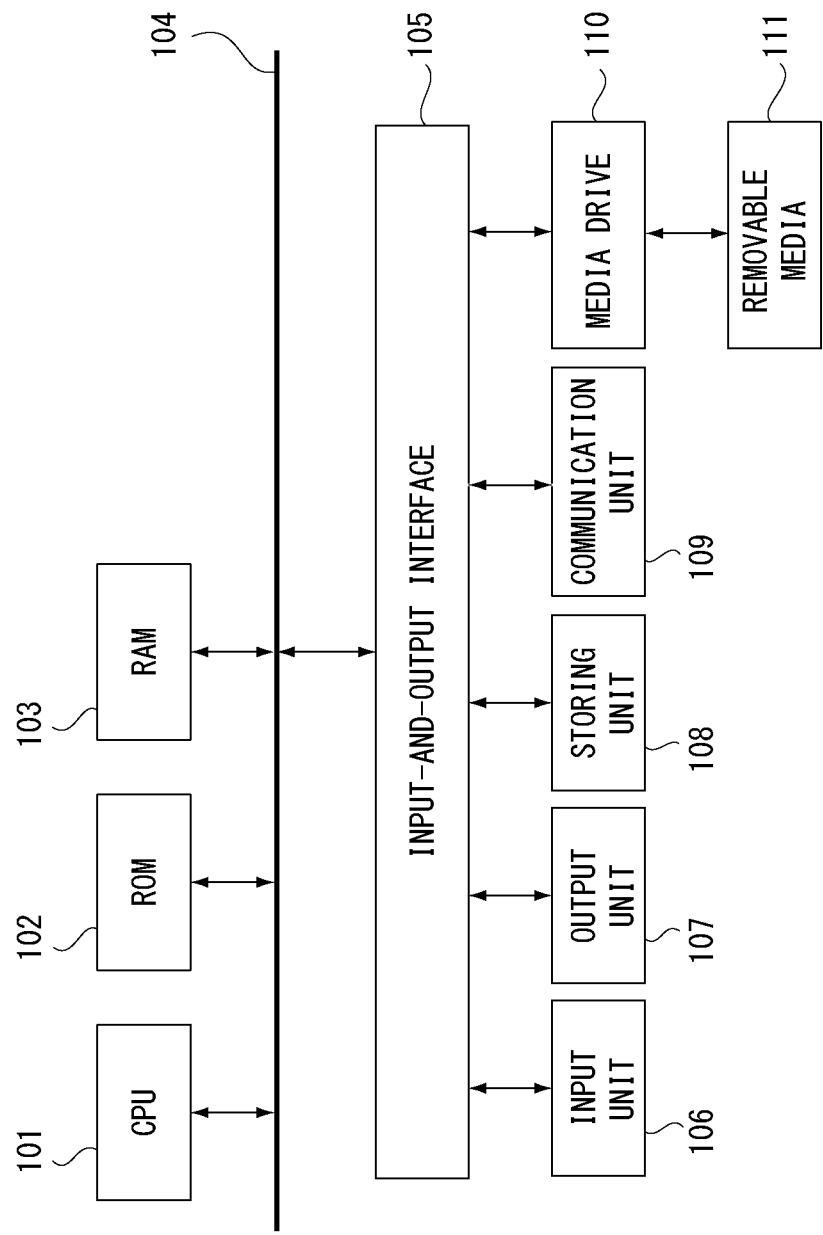
FIG. 3 is a block diagram illustrating a hardware configuration of a computer device that constructs the network system according to the embodiment.

FIG. 3 illustrates a hardware configuration of a computer device that constitutes each of the page distributing server 3, and the user terminals 4 illustrated in FIG. 1.

In FIG. 3, a Central Processing Unit (CPU) 101 of a computer device executes various processes in accordance with a program stored in a Read Only Memory (ROM) 102 or a program loaded to a Random Access Memory (RAM) 103 from the storing unit 108. The RAM 103 also stores, as appropriate, necessary data for the CPU 101 to execute various processes.

The CPU 101, the ROM 102, and the RAM 103 are connected with each other via a bus 104. An input-and-output interface 105 is also connected to this bus 104.

An input unit 106 that includes a keyboard, a mouse, a touch panel, etc., an output unit 107 that includes a display (display device), such as a Liquid Crystal Display (LCD), a Cathode Ray Tube (CRT), an organic Electroluminescence (EL) panel, etc., and 107 a speaker, etc., the storing unit 108 that includes a Hard Disk Drive (HDD), a flash memory device, etc., and a communication unit 109 for mutual communication with an external device are connected to the input-and-output interface 105.

A media drive 110 is connected to the input-and-output interface 105 as needed, a removable medium 111, such as a magnetic disk, an optical disk, a magneto-optical disk, or a semiconductor memory, is loaded therein as appropriate, and information writing and reading is executed on the removable media 111.

According to such a computer device, communication by the communication unit 109 enables uploading or downloading of data or a program, and the data and the program can be transmitted and received via the removable media 111.

An information process and a communication to be described later are executed by the computer device that serves as, in particular, the page distributing server 3 by the CPU 101 that executes process operations based on the various programs.

Note that each device illustrated in FIG. 1 including the page distributing server 3 is not limited to a case in which the computer device illustrated in FIG. 3 is configured as a single device, and a plurality of computer devices may be combined as a system. The plurality of computer devices may be combined as a system via a LAN, etc., or may be placed at respective remote sites via a VPN, etc., that utilizes the Internet.

[1-3. Page Display Method According to First Embodiment]

Various functions achieved by the page distributing server 3 will be described with reference to FIG. 4 that is a functional block diagram.

Figure 4:
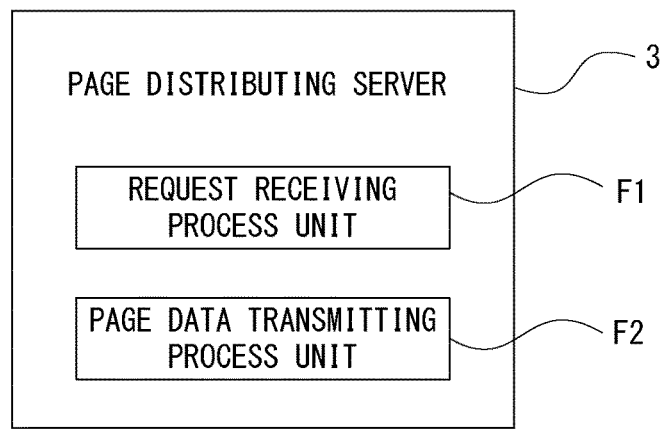
FIG. 4 is a functional block diagram illustrating, as blocks, functions for a page display method according to the embodiment.

In FIG. 4, the page distributing server 3 can be expressed as a server that includes a request receiving process unit F1 and a page data transmitting process unit F2 which are divided function by function.

The request receiving process unit F1 receives a transmission request for the web page Wp from the user terminal 4.

The page data transmitting process unit F2 transmits, to the user terminal 4, the web page data to display the entire web page WP in response to the transmission request from the user terminal 4.

Figure 5:
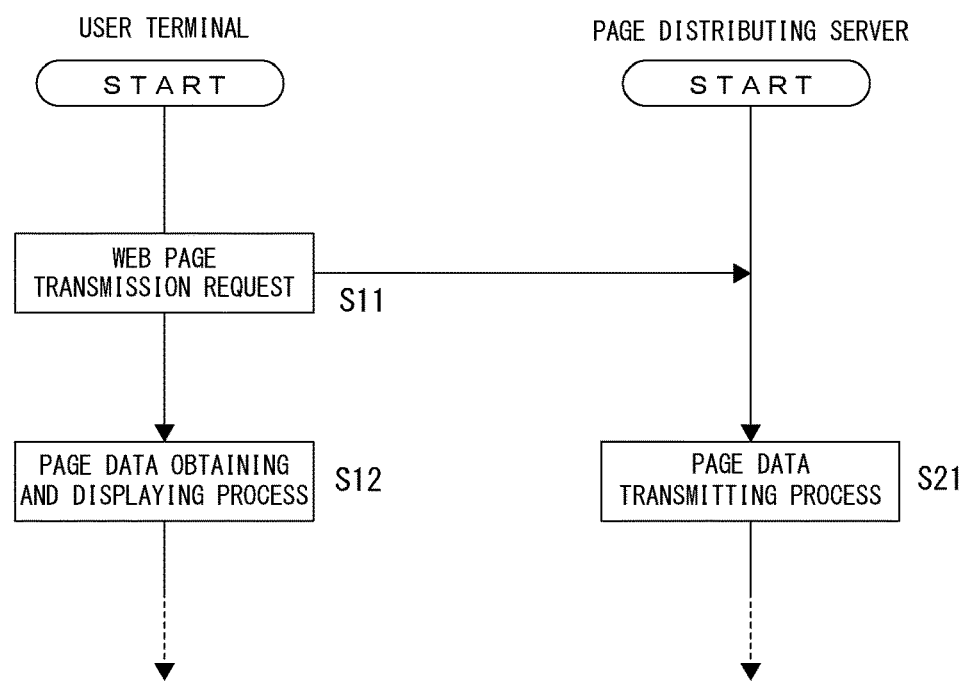
FIG. 5 is a flowchart for describing an outline of the flow from transmission of a request for a web page and to display.

With reference to FIG. 5 that is a flowchart, an outline of a flow from the transmission request for the web page Wp to a display will be described.

When the user terminal 4 transmits the transmission request for the web page Wp to the page distributing server 3 (step S11), the page distributing server 3 starts a transmitting process of the web page data to display the web page Wp (step S21).

At this time, the web page data that is transmitted from the page distributing server 3 to the user terminal 4 contains at least document data for indicating a layout of each part, text information to be displayed, etc., such as HTML data. Moreover, this web page data may contain Cascading Style Sheets (CSS) data for indicating the style of the web page, image data to be displayed within the page, and a source code like a JavaScript.

The user terminal 4 executes a page data obtaining and displaying process to display the web page Wp based on the document data like the HTML data received from the page distributing server 3 (step S12).

The page data obtaining and displaying process is a process executed by the browser of the user terminal 4, and is to execute an analysis process on the received document data like the HTML data, a process of obtaining data that is specified by the document data from the page distributing server 3, a layout process on the parts P based on the result of the analysis process, and a creating process of graphic data based on the result of the layout process and the obtained data to display the web page Wp on the browser screen based on the graphic data.

As is conventionally known, regarding the display of a web page based on document data, such as HTML and XML, the layout and drawing of the parts P do not start after all components of the document data are analyzed, but every time a partial analyze from the header part of the document data completes in sequence, the obtainment of data, the layout process, and the drawing process are executed. Likewise, the page data obtaining and displaying process executes each process of analysis, data obtainment, layout, and drawing part by part from the header part of the document data. This improves a speed until contents are displayed after the start of page transition.

Note that as is understandable from the foregoing description, the obtainment (downloading) of the web page data by the user terminal 4 from the page distributing server 3 is also executed after the display of the web page Wp starts.

In this embodiment, the page data transmitting process unit F2 illustrated in FIG. 4 transmits the web page data that contains the program for causing the user terminal 4 to achieve the following functions in response to the transmission request for the web page Wp.

That is, the functions are a completion determination function f1 that determines whether or not the reading of predetermined data necessary to display the web page Wp up to the specific part Pp has been completed after the browser of the user terminal 4 starts reading the web page data, and an intermediate movement function f2 that moves the position of the browser screen to a specific scroll position PSp that is a position where the specific part Pp is contained in the browser screen in accordance with a determination by the completion determination function f1 that the reading has been completed.

Note that the completion determination function f1 in this embodiment determines whether or not the reading of all pieces of data necessary to display up to the specific part Pp as "reading of the predetermined data necessary to display up to the specific part Pp".

In this case, "the reading of the predetermined data necessary to display up to the specific part Pp has been completed" means that a preparation for displaying the predetermined data necessary to display up to the specific part Pp has been completed. More specifically, an example is a case in which the download or layout process for the predetermined data necessary to display up to the specific part Pp has been completed. Alternatively, another example is a case in which the creation of graphic data for the predetermined data necessary to display up to the specific part Pp has been completed.

The determination process by the completion determination function f1 may be a process of determining an arrival of an arbitrary timing during a process procedure after the downloading of the predetermined data necessary to display up to the specific part Pp has been completed and until the graphic data is created.

Moreover, the page data transmitting process unit F2 according to this example transmits the above-described specific part notification information I1 as the information of notifying the user terminal 4 of the specific part Pp in the web page Wp in response to the transmission request for the web page Wp. More specifically, this is information for notifying the user terminal of the question portion located next to the question portion subjected to the above-described automatic input. In this example, the part P that forms the question portion is the specific part Pp.

The completion determination function f1 and the intermediate movement function f2 will be described with reference to FIG. 6 and FIG. 7.

Figure 6A:
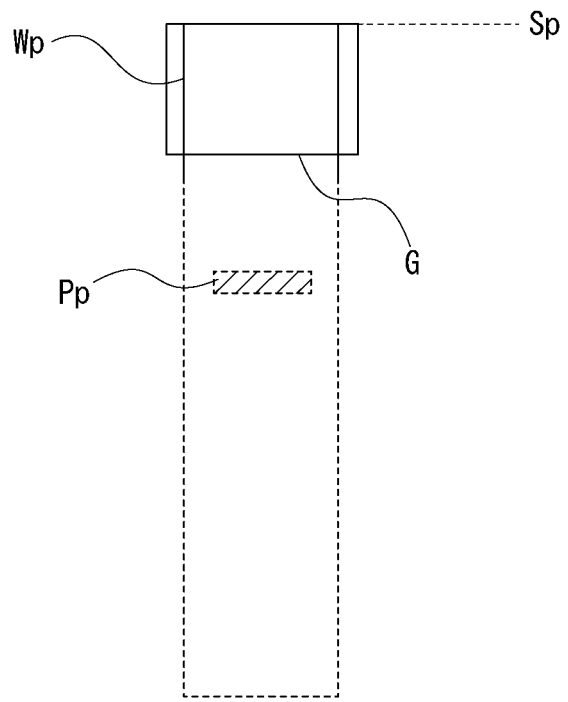
FIGS. 6A and 6B are diagrams schematically indicating a relationship between a web page and a browser screen.
Figure 6B:
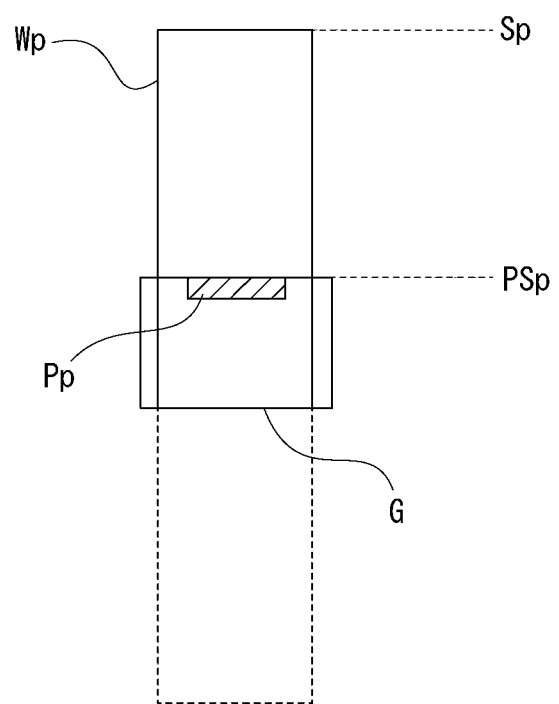

FIG. 6A and FIG. 6B schematically indicating a relationship between the web page Wp and a browser screen G (this term is utilized below as the browser screen of the user terminal 4).

In this example, the web page Wp is a page that has a length in the vertical direction, and the scroll direction is consistent with the vertical direction. In this case, a header position Sp of the web page Wp matches the upper end of the web page Wp.

FIG. 6A illustrates an aspect immediately after page transition to the web page Wp which is an aspect when the reading of the header part only of the web page Wp has been completed.

The browser screen G is located at the header part of the web page Wp immediately after the page transition. More specifically, in this example, the upper end of the browser screen G matches the header position Sp of the web page Wp. In this case, displayed in browser screen G are the contents of the header part in the web page Wp.

When the reading of the web page data by the page data obtaining and displaying process (step S12) advances from the state illustrated in FIG. 6A, the above-described completion determination function f1 determines whether or not the reading of the predetermined data necessary to display up to the specific part Pp has been completed (in this embodiment, whether or not the reading of all pieces of data necessary to display up to the specific part Pp has been completed).

When the completion determination function f1 determines that the above-described reading has been completed, the intermediate movement function f2 moves the browser screen G to a specific scroll position PSp illustrated in FIG. 6B. Note that FIG. 6B illustrates an example case in which the specific scroll position PSp of the browser screen G is defined as a position with reference to the upper end position of the browser screen G.

In this example, the specific scroll position PSp is defined as a position where the end side position of the specific part Pp and the end side position of the browser screen G at the page header side match with each other (in this example, a position where the respective upper ends match). Accordingly, an input field is located in the header part within the browser screen G, facilitating the user to understand the field that the user should start inputting.

Figure 7:
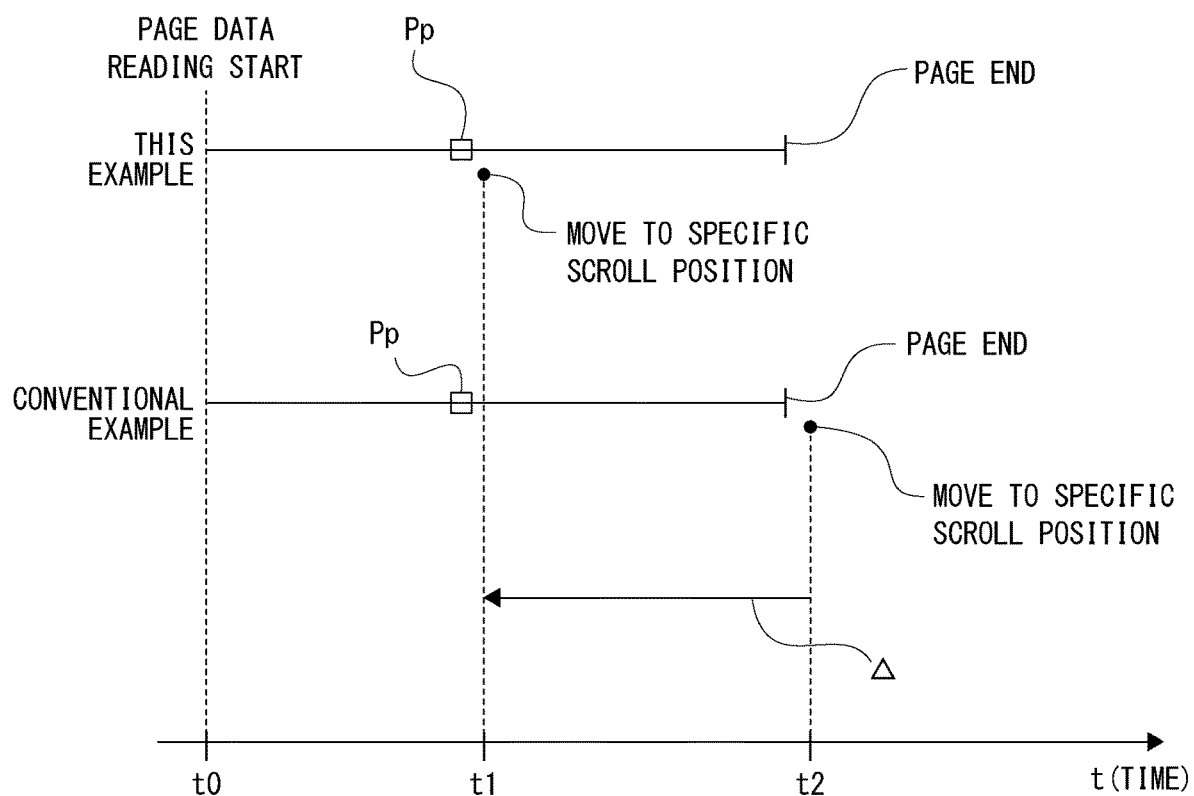
FIG. 7 is an explanatory diagram of an effect by an intermediate movement function.

FIG. 7 is an explanatory diagram of a result by the intermediate movement function f2 according to this example, and illustrates a time necessary until the specific part Pp is presented from a start time point of reading the web page data ("t0" in the figure) in comparison with that of a conventional example that has no intermediate movement function f2 of this example.

According to the conventional technology, the browser screen G is moved to the specific scroll position PSp after the reading of the entire web page Wp has been completed. In this case, a time necessary to present the specific part Pp is a time from a time point t0 to a time point t2.

In contrast, according to this example, since the browser screen G is moved to the specific scroll position PSp in accordance with the completion of the reading up to the specific part Pp, the time necessary to present the specific part Pp is reduced to a time from the time point t0 to a time point t1. In the figure, the difference in time until the specific part Pp is presented between this example and conventional technology is expressed as "Δ".

As described above, according to this example, the specific part Pp can be presented to the user before the reading of the entire web page Wp is completed, and thus the part where the user wants to browse can be promptly presented.

Note that after the movement to the specific scroll position PSp, the page data obtaining and displaying process still continues. That is, the display scheme according to this example is not to partially read the data on only the specific part Pp in the entire web page Wp.

In this case, when, for example, the time necessary until reading of the entire page is completed is short such that the communication environment is adequate or the quantity of page data is little, the difference in time until the specific part Pp is presented is not likely to be created between the case in which the intermediate movement is executed by the intermediate movement function f2 and the case in which no intermediate movement is executed. That is the prompt presentation effect by the intermediate movement function f2 becomes little.

In contrast, when the time necessary until the reading of the entire page is completed is long such that the communication environment is inadequate or the quantity of the page data is large, the difference in time until the specific part Pp is presented is likely to be created between the case in which the intermediate movement is executed and the case in which no intermediate movement is executed, and thus the prompt presentation effect by the intermediate movement function f2 is enhanced.

Hence, according to this embodiment, the user terminal 4 is caused to achieve the following three functions.

That is, a reading time estimation function f3 to estimate a page reading time Tr that is a time necessary to complete the reading of the entire web page Wp, an intermediate movement permission function f4 to permit a movement to the specific scroll position PSp by the intermediate movement function f2 when the page reading time Tr is estimated as being equal to or longer than a predetermined time, and an intermediate movement prohibition function f5 to prohibit the movement to the specific scroll position PSp by the intermediate movement function f2 when the page reading time Tr is estimated as being shorter than the predetermined time, and to execute the movement to the specific scroll position PSp after the reading of the entire web page Wp is completed.

In this example, as the reading time estimation function f3, a communication speed (the quantity of read data per a unit of time) is measured, and the page reading time Tr is estimated based on the communication speed and on the data quantity of the entire web page Wp. More specifically, "the data quantity of the entire web page Wp/the communication speed" is obtained as the page reading time Tr.

In this case, the information on the data quantity of the entire web page Wp is contained in the part of the web page data transmitted from the page distributing server 3 in this example.

When the estimated page reading time Tr is equal to or longer than a predetermined threshold TH, the intermediate movement permission function f4 permits the movement to the specific scroll position PSp of the browser screen G by the intermediate movement function f2.

Conversely, when the page reading time Tr is shorter than the predetermined threshold TH, the intermediate movement prohibition function f5 prohibits the movement to the specific scroll position PSp of the browser screen G by the intermediate movement function f2, and executes the movement to the specific scroll position PSp of the browser screen G after the reading of the entire web page Wp is completed.

According to each of the above-described functions, when the page reading time Tr is estimated as being long such that the communication environment is inadequate or the page data quantity is large, etc., the intermediate movement of the browser screen G is executed, but when the page reading time Tr is estimated as being short such that the communication environment is adequate, or the page data quantity is little, the intermediate movement of the browser screen G is not executed, and the process simplification is attempted.

Therefore, the prompt presentation of the specific part Pp to the user is accomplished while reducing a process load to the user terminal 4.

The page distributing server 3 according to this embodiment transmits, to the user terminal 4, the web page data containing a program to achieve, in addition to the above-described completion determination function f1 and intermediate movement function f2, the reading time estimation function f3, the intermediate movement permission function f4, and the intermediate movement prohibition function f5 via the page data transmitting process unit F2.

[1-4. Process Procedure]

A process procedure that should be executed in order to achieve each of the above-described functions of the user terminal 4 will be described with reference to a flowchart that is FIG. 8.

Figure 8:
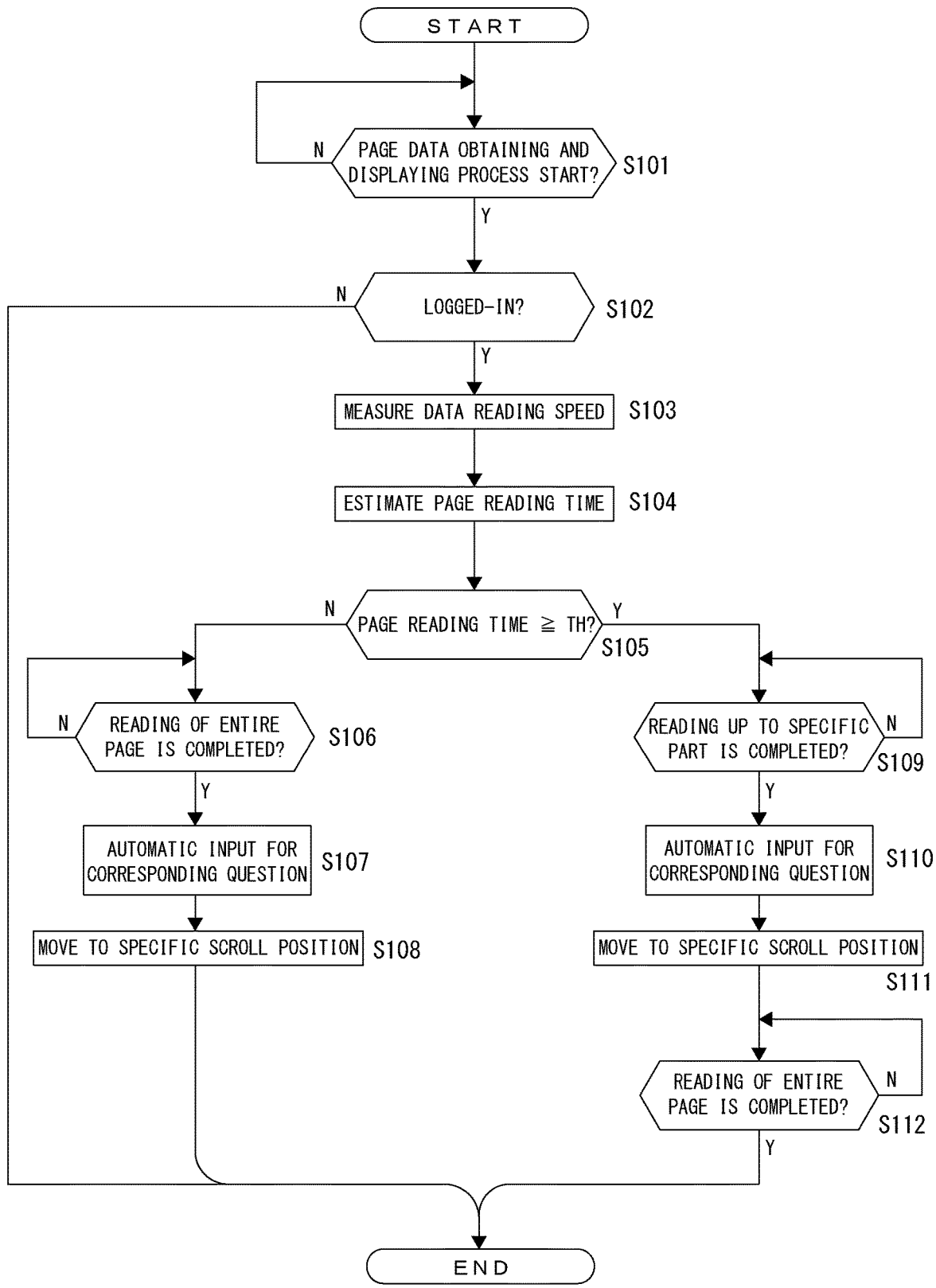
FIG. 8 is a flowchart illustrating procedures of a process that should be executed in order to achieve each function of a terminal device according to a first embodiment.

The process illustrated in FIG. 8 is executed by the CPU 101 of the user terminal 4 in accordance with the program contained in the web page data from the page distributing server 3. An example program is a program that is described by source codes like JavaScript.

The process illustrated in FIG. 8 is executed in parallel with the page data obtaining and displaying process (step S12) illustrated in FIG. 5. Note that the term "CPU 101" in the description for FIG. 8 indicates the CPU 101 of the user terminal 4 unless particularly mentioned.

First, the CPU 101 stands by, in step S101, until the start of the page data obtaining and displaying process in the step S12, and determines in step S102 whether or not it is presently logged-in when the page data obtaining and displaying process in the step S12 is started. That is, a determination is made on whether or not it is presently logged-in to the above-described predetermined website.

When it is not presently logged-in, the CPU 101 ends the process illustrated in FIG. 8. That is, in this case, the automatic input to the subject question in the header part of the page is not executed, and the movement to the specific scroll position PSp of the browser screen G is not executed also. Therefore, the user inputs an answer from the question in the header part of the web page Wp.

Conversely, when it is determined in the step S102 as being presently logged-in, the CPU 101 progresses the process to step S103, executes a measuring process of the data reading speed, and estimates the page reading time Tr in a subsequent step S104. That is, according to this example, the calculation result based on "the data quantity of the entire web page Wp/the data reading speed" is obtained as the page reading time Tr.

Furthermore, the CPU 101 determines in a subsequent step S105 whether or not the page reading time Tr is equal to or longer than the threshold TH.

When the page reading time Tr is not equal to or longer than the threshold TH, the CPU 101 progresses the process to step S106.

The CPU 101 stands by in the step S106 until the reading of the entire page (the entire web page Wp) is completed, and when the reading of the entire page is completed, the automatic input process to the corresponding questions is executed in step S107. That is, regarding the question located at the header part of the page and for the user attribute information, the process of inputting the corresponding attribution information as the answer information to the question is executed. At this time, the input answer information is also reflected on the graphic data so as to enable the user to check the automatically input answer information via the browser screen G.

In the step S107, when the user attribute information to be input is stored in, for example, the Cookie (Cookie) of the browser, this information is utilized. Alternatively, the user attribute information to be input is also obtainable from an external database that registers (stores) the user attribute information by a communication via the network 2.

The CPU 101 executes in a subsequent step S108 a process of moving the position of the browser screen G in the scroll direction to the specific scroll position PSp from the header position Sp as a movement process to the specific scroll position PSp.

In response to the execution of the movement process in the step S108, the CPU 101 ends the process illustrated in FIG. 8.

Moreover, when the page reading time Tr is equal to or longer than the threshold TH in the above-described step S105, the CPU 101 progresses the process to step S109.

The CPU 101 stands by in the step S109 until the reading up to the specific part Pp is completed. That is, the CPU stands by until the downloading of the web page data up to the specific part Pp from the page distributing server 3 is completed.

When a determination is made that the reading up to the specific part Pp has been completed, the CPU 101 executes in the step S110 the automatic input process on the corresponding question, and executes in subsequent step S111 the movement process to the specific scroll position PSp. Note that the processes in the steps S110 and S111 are the same as those in the steps S107 and S108, respectively, and the redundant description will be omitted.

In response to the execution of the movement process in the step S111, the CPU 101 stands by in step S112 until the reading of the entire page is completed, and ends the process illustrated in FIG. 8 in response to the completion of the reading of the entire page.

In this case, the movement to the specific scroll position PSp in the step S108 or in the step S111 can be executed as a scroll movement. This enables the user to check the automatically input information for the question at the portion that cannot be displayed by the browser screen G immediately after the page transition (the browser screen G located at the page header position Sp) among the questions subjected to the automatic input.

Alternatively, the movement to the specific scroll position PSp can be also executed as an instant movement (the displayed details within the browser screen G is instantly changed to the details that contains the specific part Pp). This achieves a reduction in time until the specific part Pp is presented.

Note that the above description has been given of an example case in which the automatic input process (S107, S110) to the corresponding question is executed before the movement to the specific scroll position PSp, such a process can be also executed after the movement to the specific scroll position PSp. This achieves a reduction in time necessary until the specific part Pp is presented.

Moreover, although the above description has been given of an example case in which the communication speed is measured as a speed after the start of reading the web page Wp, when, for example, the communication speed measurement is executed as a separate process from the process in FIG. 8 such that the user terminal 4 is constantly measuring the communication speed over the network 2, the measurement result by such a separate process is also applicable.

Furthermore, the movement function to the specific scroll position PSp may be enabled or disabled in accordance with a user's operation, etc. In the case of, for example, the questionnaire survey answer page described in the embodiment as an example, an operation that instructs enabling or disabling of the automatic input function to the corresponding question may be accepted, when the instruction to enable the automatic input function is given through the operation, the movement function to the specific scroll position PSp may be enabled, and when the instruction to disable the automatic input function is given through the operation, the movement function to the specific scroll position PSp may be disabled.

Moreover, according to this example, although the specific scroll position PSp is the position where the respective end sides of the specific part Pp and the browser screen G at the page-header side match (see FIG. 6B), at the time point at which the browser screen G moves to the specific scroll position PSp in this case, a part that has been insufficiently read (a part that does not have all pieces of data subjected to display) may be contained within the browser screen G, and a region that is insufficiently displayed may be created at the part below the specific part Pp in the browser screen G (although it is tentative).

Accordingly, in order to suppress a creation of such a region that is insufficiently displayed, the specific scroll position PSp may be defined as a position where the respective end sides of the browser screen G and the specific part Pp at the page-end side match.

Note that the specific scroll position PSp may be set as a position where, for example, the specific part Pp is contained in the browser screen G, and arbitrary setting such that the respective center positions of the browser screen G and the specific part Pp match may be made.

Moreover, the transmission request for the web page Wp given by the user terminal 4 may contain a display request for the specific part Pp in the web page Wp. In this case, the page distributing server 3 transmits, to the user terminal 4, the web page data that contains the program to achieve the completion determination function f1 and the intermediate movement function f2 in response to the transmission request for the web page Wp which contains the display request for the specific part Pp.

[1-5. Summary of First Embodiment]

As described above, the information processing device (the page distributing server 3) according to the first embodiment includes the request receiving unit (the request receiving process unit F1) that receives the transmission request for the web page (Wp) from the terminal device (the user terminal 4), and the page data transmitting unit (the page data transmitting process unit F2) that transmits, to the terminal device, the web page data to display the entire web page in response to the transmission request.

Next, the page data transmitting unit transmits the web page data containing the program that causes the terminal device to achieve the completion determination function (f1) to determine whether or not the reading of the predetermined data necessary to display up to the specific part (Pp) in the web page has been completed after the browser of the terminal device starts reading the web page data, and the intermediate movement function (f2) to move the position of the browser screen to the specific scroll position (PSp) which is a position where the specific part is contained in the browser screen (G) in response to the determination by the completion determination function that the reading has been completed.

Accordingly, even the transmission of the entire web page is premised, before the reading of the entire web page data is completed, the browser screen can display the specific part.

Therefore, when the user wants to browse the specific part of the web page for which transmission of the entire web page is presumed, the prompt presentation of the specific part to the user is accomplished.

Moreover, according to the information processing device of the first embodiment, the page data transmitting unit transmits the web page data that contains the program which causes the terminal device to achieve the reading time estimation function (f3) to estimate the page reading time which is the time necessary until the reading of the entire web page is completed, the intermediate movement permission function (f4) to permit the movement to the specific scroll position by the intermediate movement function when the page reading time is estimated as being equal to or longer than the predetermined time, and the intermediate movement prohibition function (f5) to prohibit the movement to the specific scroll position by the intermediate movement function when the page reading time is estimated as being less than the predetermined time, and to execute the movement to the specific scroll position after the reading of the entire web page is completed.

When the time necessary to read the entire page is long such that the communication environment is inadequate or the page data quantity is large, the difference in time until the specific part is presented is likely to be created between the case in which the intermediate movement is executed and the case in which the intermediate movement is not executed. In such a case, the intermediate movement is executed to enable the prompt presentation of the specific part to the user.

In contrast, when the time necessary to read the entire page is short such that the communication environment is adequate or the page data quantity is little, the difference in time until the specific part is presented is not likely to be created between the case in which the intermediate movement is executed by the intermediate movement function and the case in which the intermediate movement is not executed. Hence, in such a case, the intermediate movement is not executed to simplify the process by the terminal device, thereby reducing a process load.

Consequently, the prompt presentation of the specific part to the user is accomplished while reducing the process load to the terminal device.

Furthermore, according to the information processing device of the first embodiment, the web page is the information input page where the user inputs information for a plurality of fields, and the specific part is a display part of the specific field in the information input page.

Hence, a waiting time for the user is reduced within the information input page.

That is, a more comfortable information input environment can be provided as the information input environment where the user inputs the answer information on a questionnaire survey, or the necessary information for various applications, etc.

Furthermore, according to the information processing device of the first embodiment, the transmission request contains the display request for the above-described specific part in the above-described web page.

In this case, the information processing device transmits, to the terminal device, the web page data that contains the program to achieve the completion determination function and the intermediate movement function in response to the transmission request for the web page containing the display request for the specific part.

Hence, when the display is transitioned to the specific part within the web page in response to the request from the terminal device, the prompt presentation of the specific part to the user is accomplished.

2. Second Embodiment

[2-1. Page Display Method According to Second Embodiment]

Next, a second embodiment will be described.

The second embodiment is premised that the fields subjected to input by the user are provided across a plurality of web pages such that a plurality of web pages Wp constructs a single questionnaire survey, and based on the information input details in a web page among the sequential web pages, a display transition to the specific input field in the other page among the sequential web pages is executed.

Note that in the following description, the description for the similar details to those already described will be omitted by giving the same reference and step number unless particularly mentioned. Since the structure of the network system 1 and the respective hardware configurations of the page distributing server 3 and the user terminal 4 are the same as those of the first embodiment, the illustration thereof will be omitted.

According to the second embodiment, the following logic is set for each question regarding the web page Wp that is a questionnaire survey answer page.

1) "a3→Q44"
2) "a2→Q58, and a3→Q68"

For example, the logic (1) indicates that the display is transitioned to a question 44, when the answer (answer) to the subject question is "No. 3" (e.g., the third choice is selected as an answer). Moreover, the logic (2) indicates that the display is transitioned to a question 58 when the answer to the subject question is "No. 2", and to a question 68 when the answer is "No. 3", respectively.

The above-described logic is set for the question that needs the display transition in accordance with answer details, and every time an answer to a question is input, the user terminal 4 checks the presence or absence of the logic for such a question, and executes the display transition process in accordance with the logic and the answer details when the logic is set.

The logic is transmitted from the page distributing server 3 as a part of the web page data.

Depending on the above-described logic, the display transition may be executed for the question in the web page Wp that is different from the web page Wp to which the answer is input. When, for example, the number of questions in the web page Wp is limited to "50" in this example, and when the logic (2) is for the question present in the first page, the display transition may be executed to the question (the question 58 or 68) in the second page in accordance with the logic.

The second embodiment is to apply the intermediate movement of the browser screen G by the intermediate movement function f1 when the display transition is executed to the specific part in the new web page Wp in accordance with the logic as described above.

[2-3. Process Procedure]

With reference to the flowcharts that are FIG. 9 and FIG. 10, a process to be executed in order to achieve the page display scheme according to the second embodiment will be described.

Figure 9:
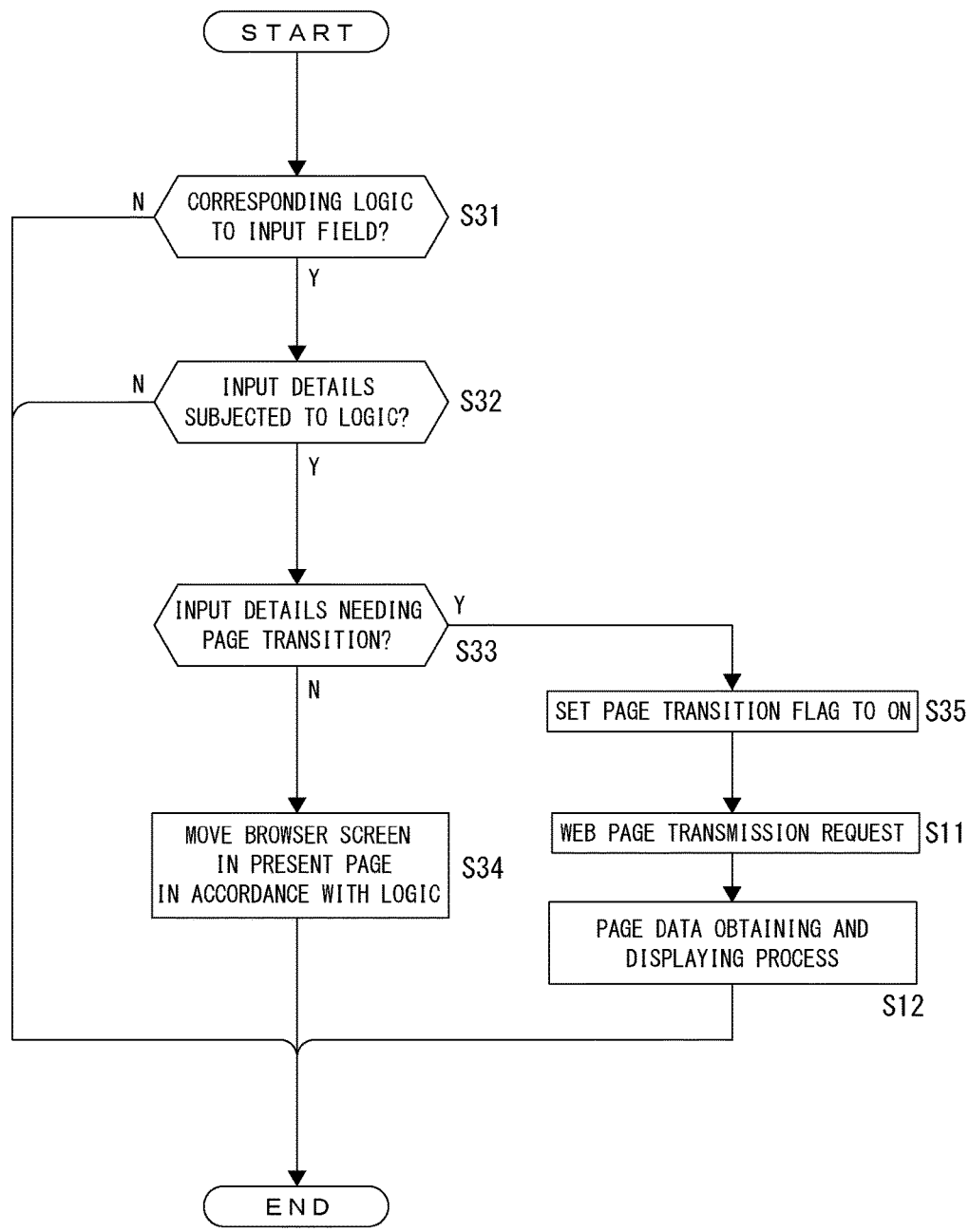
FIG. 9 is a flowchart illustrating a process that should be executed for a logic according to a second embodiment.
Figure 10:
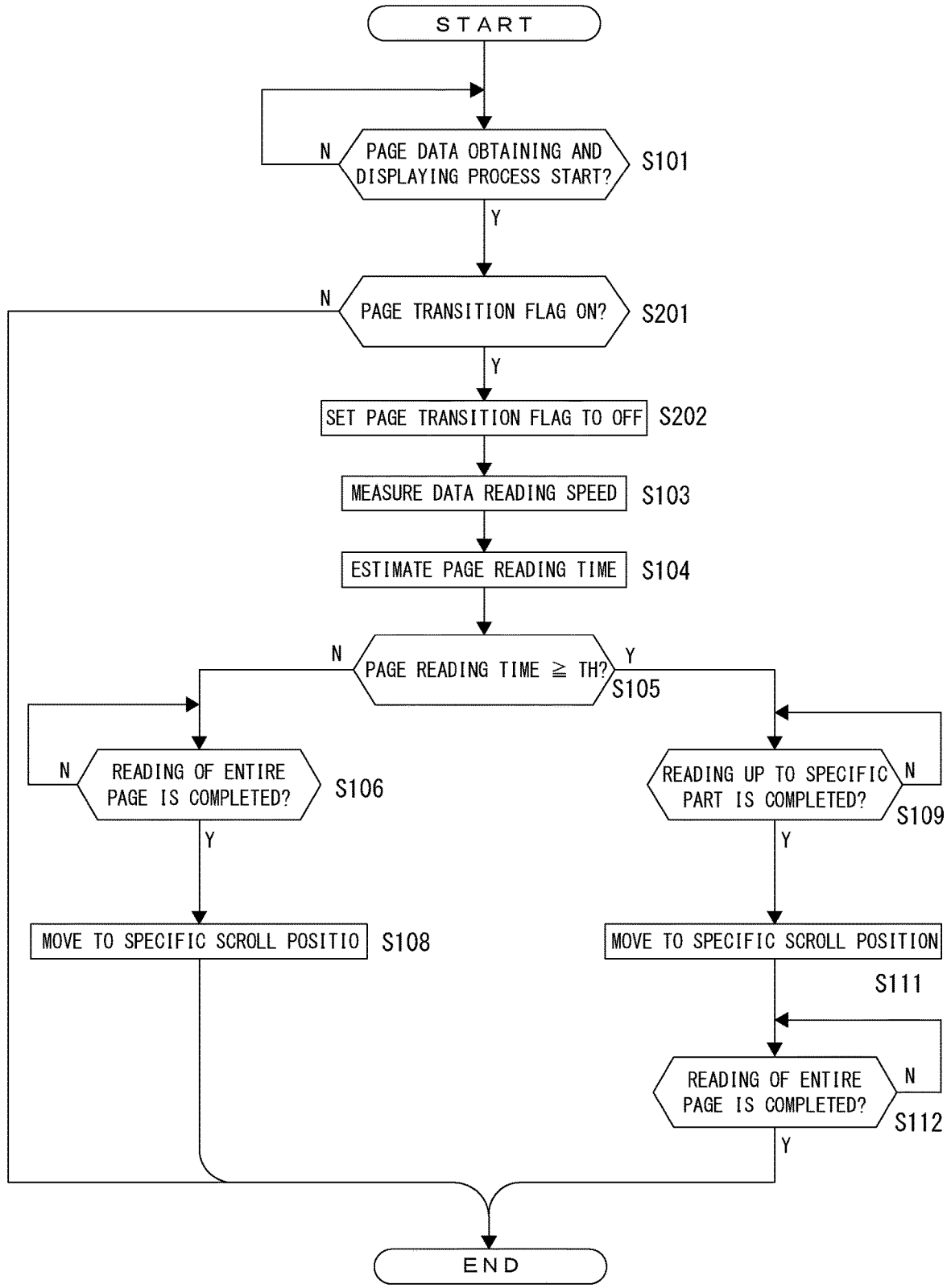
FIG. 10 is a flowchart illustrating processes to achieve the intermediate movement function (including a completion determination function, a reading time estimation function, an intermediate movement permission function, and an intermediate movement prohibition function) according to the second embodiment.

The process illustrated in FIG. 9 and in FIG. 10 is executed by the CPU 101 in the user terminal 4 based on the program transmitted as a part of the web page data. Also in FIG. 9 and in FIG. 10, unless particularly mentioned, the CPU 101 is the CPU 101 of the user terminal 4.

FIG. 9 illustrates the process to be executed regarding the logic. The Process in FIG. 9 is executed every time information is input for a question. Note that the question portion may be provided with an operating element (e.g., an input complete button) that enables the user to carry out an input completion operation, and in this case, the process illustrated in FIG. 9 is executed every time the operating element is operated.

First, the CPU 101 determines in step S31 whether or not there is the logic corresponding to an input field (a question in this example). When there is no corresponding logic, the CPU 101 ends the process illustrated in FIG. 9. That is, no automatic display transition is executed in this case.

In contrast, when there is the corresponding logic, the CPU 101 progresses the process to step S32, and determines whether or not the input details are subjected to the logic. That is, in the case of the above-described logic (2), a determination is made on whether the answer to the question is "No. 2" or "No. 3".

When the input details are not subjected to the logic, the CPU 101 ends the process illustrated in FIG. 9.

When the input details are subjected to the logic, the CPU 101 progresses the process to step S33, and determines whether or not the input details need the page transition. That is, a determination is made on whether or not the question number in the logic which is a transition destination associated with the input details indicates the question number in the web page Wp that is different from the web page Wp presently displayed.

When the input details do not need the page transition, the CPU 101 progresses the process to step S34, and executes the browser screen movement process in the present page in accordance with the logic. That is, in the web page Wp that is presently displayed, the browser screen G is moved to the question indicated by the logic (the movement to the position where the question is displayed within the browser screen G).

In accordance with the execution of the process in the step S34, the CPU 101 ends the process illustrated in FIG. 9.

In contrast, when the input details need the page transition, the CPU 101 progresses the process to step S35, sets a page transition flag to ON (e.g., "1"), and requests the transmission of the web page Wp in the step S11. That is, the transmission request for the web page Wp is made which contains the question that is a transition destination specified based on the logic and on the answer input details.

Next, in the subsequent step S12, the CPU 101 executes the page data obtaining and displaying process for the web page Wp subjected to the transmission request in the step S11, and ends the process illustrated in FIG. 9.

FIG. 10 illustrates a process to achieve the intermediate movement function f2 (including the completion determination function f1, the reading time estimation function f3, the intermediate movement permission function f4 and the intermediate movement prohibition function f5) according to the second embodiment.

The CPU 101 stands by in step S101 until the page data obtaining and displaying process (step S12 in FIG. 9) is started, and determines in step S201 whether or not the page transition flag is ON in accordance with the start of the page data obtaining and displaying process.

When the page transition flag is not ON, the CPU 101 ends the process illustrated in FIG. 10. That is, since the page transition in this case is not the page transition based on the logic, a normal display transition to the header of the page is executed.

When the page transition flag is ON, the CPU 101 progresses the process to step S202, sets the page transition flag to OFF (e.g., "0"), and progresses the process to the measurement process of the data reading speed in the step S103. As is clear from the comparison with FIG. 8, the process after the step S103 in this case differs from that of the first embodiment such that the automatic input process in the steps S107 and S110 is omitted. In this case, regarding the process in the step S109, the "specific part" in this case corresponds to the part P (question portion) that constitutes the question portion specified based on the logic and on the answer input details.

Through the above process, the intermediate movement of the browser screen G is executed in accordance with a case in which the display transition to the specific input field in the other web pages Wp is executed based on the input details in the information input field and on the logic.

Hence, when the fields subjected to the user input are provided across the plurality of pages, the waiting time for the user during the information input is reduced.

Note that according to the second embodiment, the specific part Pp may be a nearby part to the header part of the web page Wp. In this case, depending on the size of the browser screen G (in particular, the length in the scroll direction) and a display enlargement percentage, the specific part Pp may be presented with the browser screen G being in the initial position. Thus, when the specific part Pp is presented with the browser screen G being in the initial position, a setting may be made such that the intermediate movement of the browser screen G by the intermediate movement function f2 is not executed.

More specifically, based on the length of the browser screen G in the scroll direction, the position of the specific part Pp in the scroll direction, and the display enlargement percentage, a determination is made on whether or not the specific part Pp is contained in the browser screen G in the initial position, and when an affirmation result is obtained by the determination, the intermediate movement of the browser screen G by the intermediate movement function f2 is prohibited.

[2-4. Summary of Second Embodiment]

As described above, according to the information processing device (the page distributing server 3) of the second embodiment, the specific field is a field that is specified by the terminal device based on the information input details in the different information input page from the information input page that contains the specific field.

Hence, when the field subjected to the user input is provided across the plurality of pages, the waiting time for the user during inputting of the information is reduced.

Hence, a further comfortable information inputting environment is provided.

Moreover, it avoids an occasion in which the user quits inputting the information incompletely due to the waiting time during the information inputting.

3. Third Embodiment

[3-1. Page Display Scheme According to Third Embodiment]

A third embodiment causes the user terminal 4 to achieve, when a portion located at the page-header side beyond the specific part Pp contains an image, a function to read such an image later.

More specifically, the page distributing server 3 according to the third embodiment transmits the web page data that contains the program which causes the user terminal 4 to achieve an image later reading function f6 to read an image and executed after the movement to the specific scroll position PSp by the intermediate movement function f2.

[3-2. Process Procedure]

Figure 11:
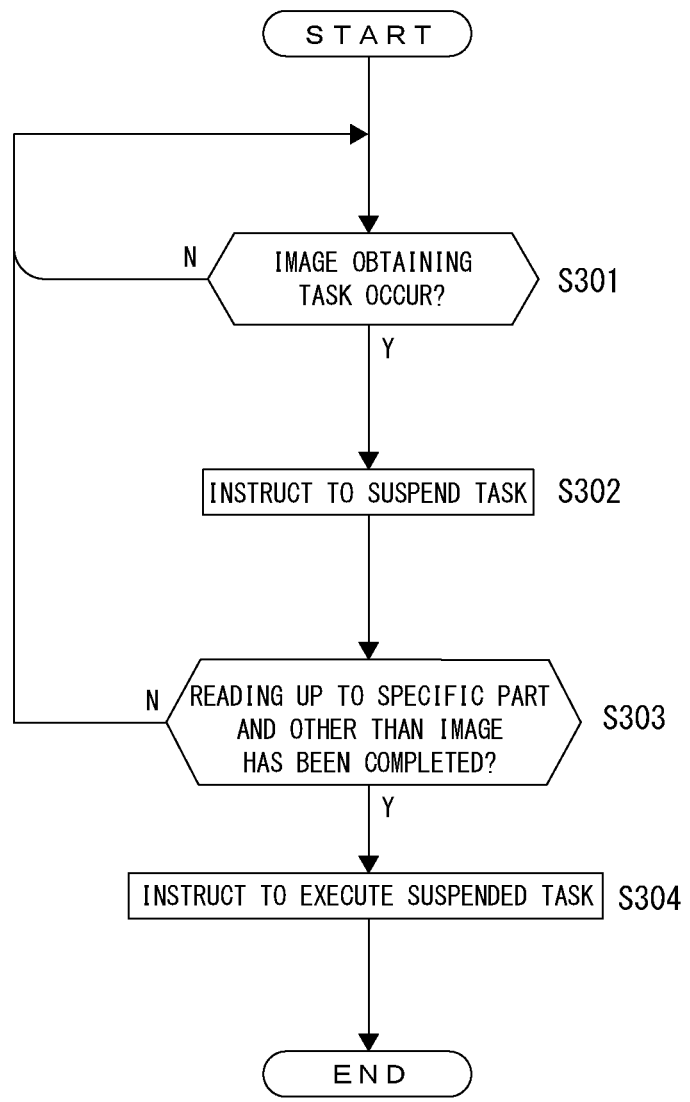
FIG. 11 is a flowchart illustrating a procedure of a process that should be executed in order to achieve an image later reading function according to a third embodiment.

A flowchart that is FIG. 11 illustrates a process procedure to be executed to achieve the image later reading function f6. In the illustration in FIG. 11, the "CPU 101" is the CPU 101 of the user terminal 4 unless particularly mentioned.

The process illustrated in FIG. 11 starts in response to the start of the page data obtaining and displaying process (S12).

First, the CPU 101 stands by in Step S301 an occurrence of an image obtaining task, i.e., an occurrence of an obtaining task for image data in the page data obtaining and displaying process.

In response to the occurrence of the image obtaining task, the CPU 101 instructs in step S302 to suspend the task. In accordance with the task suspension instruction, the image obtaining task in the page data obtaining and displaying process is suspended.

The CPU 101 determines in subsequent step S303 whether or not the reading up to the specific part Pp and other than the image has been completed.

In this case, according to the third embodiment, the "reading of the predetermined data necessary to display up to the specific part" means the reading of the data other than the image and up to the specific part Pp among the pieces of data necessary for display.

In the step S303, when the reading other than the image and up to the specific part Pp has not been completed yet, the CPU 101 returns the process to the step S301, and stands by again the occurrence of the image obtaining task. Hence, the obtaining task is suspended for the image data that is present between the specific part Pp and the header of the web page Wp.

In contrast, when the reading other than the image and up to the specific part Pp has been completed, the CPU 101 progresses the process to step S304, and instructs the execution of the suspended task. In response to the execution instruction, the image obtaining task suspended in the step S302 is executed in page data obtaining and displaying process.

The CPU 101 ends the process illustrated in FIG. 11 in accordance with the execution of the process in the step S304.

Note that the specific part Pp may be a part that contains an image. When the specific part Pp contains an image, the obtaining task for such an image is excluded from the suspension candidate in the step S302. More specifically, in this case, for example, as for the process between the step S301 and the step S302, a process of determining whether or not the occurred image obtaining task is the obtaining task for the image in the specific part Pp may be provided, when a denial result is obtained by this process, the process may progress to the step S302, and when the affirmative result is obtained, the step S302 may be skipped and the process may progress to the step S303.

[3-3. Summary of Third Embodiment]

As described above, according to the information processing device (the page distributing server 3) of the third embodiment, when the image is contained in the part located at the page-header side beyond the specific part in the web page, the web page data is transmitted which contains the program that causes the terminal device to achieve the image later reading function (f6) to execute the reading of the image after the movement to the specific scroll position by the intermediate movement function.

By postponing the reading of the image located at the page-header side beyond the specific part, a reduction in time that needs to complete the reading up to the specific part is accomplished.

Therefore, the specific part can be further promptly presented to the user.

4. Fourth Embodiment

[4-1. Page Display Method According to Fourth Embodiment]

According to each of the above-described embodiments, the description has been given of an example case in which, after the reading of the web page data starts, in response to the completion of the reading of the data necessary to display up to the specific part Pp, the intermediate movement function f2 moves the position of the browser screen G to the specific scroll position PSp.

Regarding the reading of the web page data, instead of starting reading from the header position Sp of the web page Wp, the data on the specific part Pp may be preferentially read. More specifically, instead of reading the data necessary to display up to the specific part Pp from the header position Sp, reading of the data on a part of the entire web page Wp containing the specific part Pp, is executed in preference to the data on the other part.

The part of the web page Wp which is subjected to the preferential data reading to the other part and which contains the specific part Pp will be referred to as a "preferential part Yp" below.

Moreover, a function of reading the data necessary to display the preferential part Yp in preference to the data on the other part will be referred to as a "preferential reading function f7" below.

According to this embodiment, the web page data contains a program that causes the user terminal 4 to achieve the above-described preferential reading function f7.

Moreover, the web page data in this case contains the program that causes the user terminal 4 to achieve a completion determination function f1' instead of the completion determination function f1. This completion determination function f1' is to determine whether or not the reading of the data necessary to display the preferential part Yp has been completed.

Hence, in this case, the intermediate movement function f2 moves the position of the browser screen G to the specific scroll position in response to the completion of the reading of the data on the preferential part Yp.

The completion determination function f1' and the intermediate movement function f2 according to the fourth embodiment will be described with reference to FIGS. 12A and 12B.

Figure 12A:
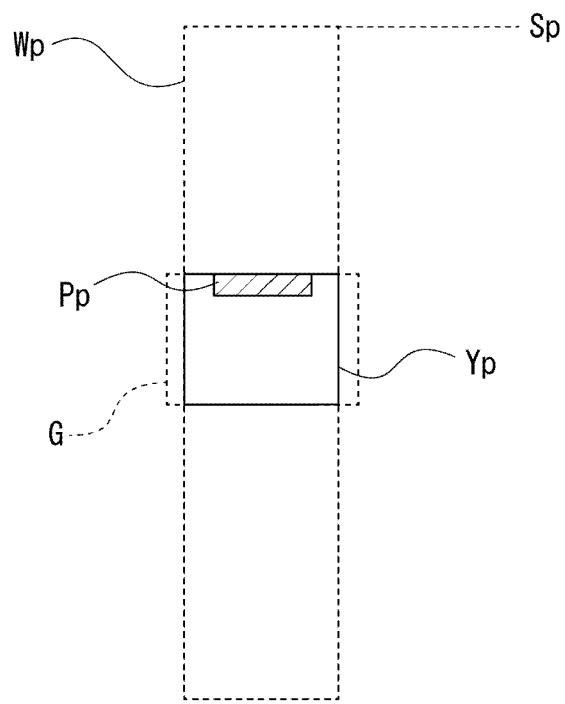
FIGS. 12A and 12B are diagrams for describing a function of the terminal device according to a fourth embodiment.

FIG. 12A is an explanatory diagram for the preferential part Yp. According to this example, the preferential part Yp contains not only the specific part Pp but also a part to be displayed within the browser screen G with the browser screen G being located at the specific scroll position PSp. Note that the preferential part Yp may be a part that contains at least the specific part Pp.

Figure 12B:
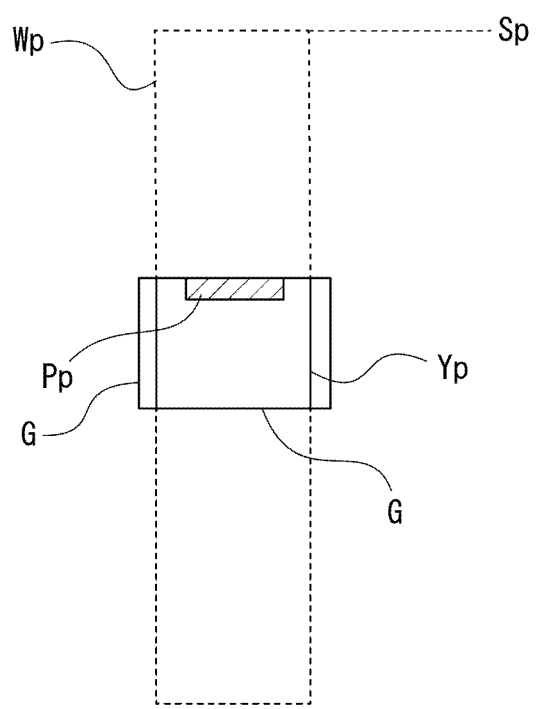

FIG. 12B illustrates a state in which the completion determination function f1' determines that the reading of the data on the preferential part Yp has been completed, and the intermediate movement function f2 moves the browser screen G to the specific scroll position PSp. In this state, the preferential part Yp that contains the specific part Pp is displayed within the browser screen G.

As described above, according to the fourth embodiment, when the browser screen G is moved to the specific scroll position PSp in response to the completion of the reading of the data necessary to display the position that contains the specific part Pp, the data on the preferential part Yp that contains the specific part Pp is read in preference to the data on the other part.

This accomplishes a further prompt presentation of the specific part Pp.

Figure 13:
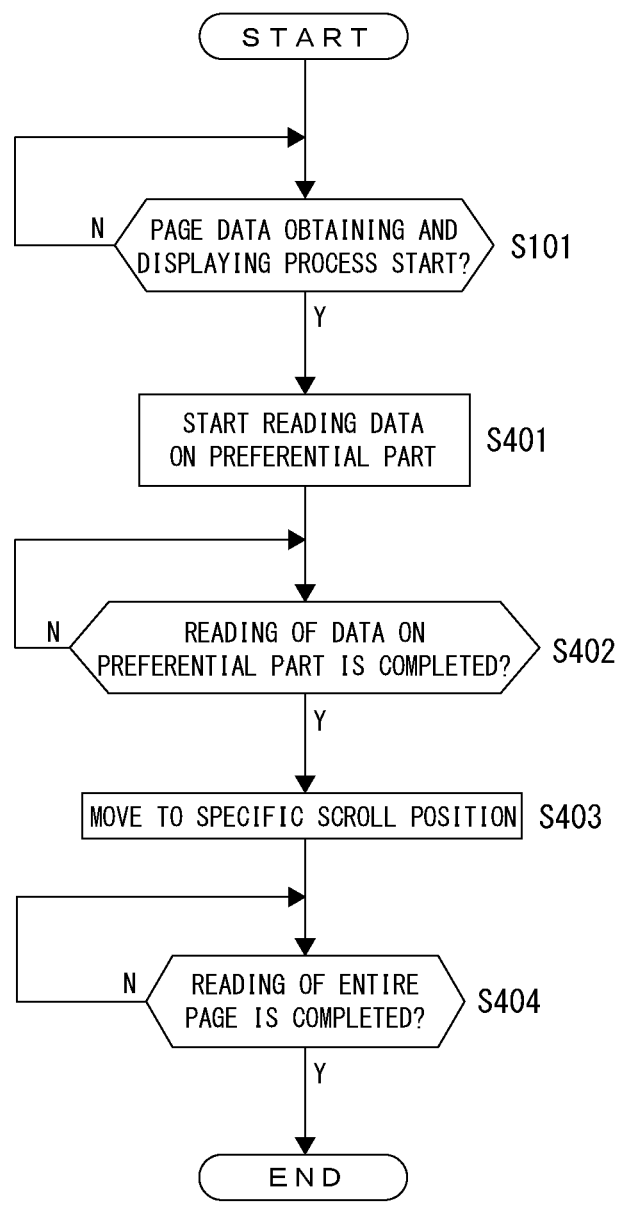
FIG. 13 is a flowchart illustrating a procedure of a process that should be executed in order to achieve the function of the terminal device according to the fourth embodiment.

With reference to FIG. 13 that is a flowchart, a process procedure that should be executed in order to achieve each function of the above-described user terminal 4 will be described. Note that, like FIG. 8, etc., the process illustrated in FIG. 13 is executed by the CPU 101 of the user terminal 4 in accordance with the program contained in the web page data from the page distributing server 3.

First, the CPU 101 in this case also stands by in step S101 until the page data obtaining and displaying process in the step S12 starts. When the page data obtaining and displaying process starts, the CPU 101 in this case starts reading the data on the preferential part Yp in step S401, and stands by in subsequent step S402 until the reading of the data on the preferential part Yp is completed. Note that the CPU 101 in this case also identifies the specific part Pp in the web page Wp based on the above-described specific part notification information I1.

When the reading of the preferential part Yp is completed, the CPU 101 progresses the process to step S403, and executes the movement process to the specific scroll position PSp. Moreover, the CPU 101 stands by in subsequent step S404 until the reading of the entire page is completed, and ends the process illustrated in FIG. 13 in response to the completion of the reading of the entire page.

Note that the movement to the specific scroll position PSp in the step S403 may be executed as a scroll movement from the header of the page, or may be executed as the above-described instant movement.

In this case, according to the fourth embodiment, after the reading of the data on the preferential page Yp is completed, the data on a part immediately before the preferential part Yp from the header of the page may be read. Alternatively, in view of a downward scroll operation from the specific scroll position PSp in advance, the data on a part subsequent to the preferential part Yp may be read.

[4-2. Summary of Fourth Embodiment]

As described above, according to the information processing device (the page distributing server 3) of the fourth embodiment, the program further causes the terminal device (the user terminal 4) to achieve the preferential reading function to read, from the information processing device, a part of the web page data corresponding to the position that contains the specific part in preference to the other part of the web page data.

This accomplishes a further prompt presentation of the specific part to the user when the user wants to browse the specific part in the web page for which transmission of the entire web page is presumed.

5. Program and Storage Medium

As described above, although the page distributing server 3 as an embodiment of the information processing device according to the present disclosure has been described, a first program according to the embodiment causes the information processing device (CPU, etc.) to execute the process of the page distributing server 3.

A first program according to the embodiment is a computer-readable program that causes a computer device to achieve a request receiving function (the request receiving process unit F1) to receive the transmission request for the web page from the terminal device, and the page data transmitting function (the page data transmitting process unit F2) to transmit, to the terminal device, the web page data for displaying the entire web page in response to the transmission request.

Moreover, the page data transmitting function is to transmit the web page data that contains the program which causes the terminal device to achieve the completion determination function (f1) to determine whether or not the reading of the predetermined data necessary to display up to the specific part in the web page has been completed after the browser of the terminal device starts reading the web page data, and the intermediate movement function (f2) to move the position of the browser screen to the specific scroll position which is a position where the specific part is contained in the browser screen in accordance with the determination by the completion determination function that the reading has been completed.

That is, this program corresponds to the program that causes the information processing device like the page distributing server 3 to execute the process described with reference to FIG. 5, etc.

Such a program achieves the information processing device as the page distributing server 3 as described above.

Moreover, such a program can be stored beforehand in a storage medium like a built-in hard disk drive of a computer device, etc., or a ROM, etc., in a microcomputer device that has a CPU. Alternatively, the program may be temporarily or permanently recorded (stored) in removable storage media, such as a semiconductor memory, a memory card, an optical disk, a magneto-optical disc, and a magnetic disk. Furthermore, such a removable storage medium can be provided as a so-called package software.

Still further, such a program may be installed in a personal computer device, etc., from the removable storage medium, and is also downloadable from a download site via a network, such as a LAN or the Internet.

Moreover, the second program according to the embodiment causes a computer device (CPU, etc.) to execute the process of the user terminal 4 in the above-described embodiment.

A second program according to the embodiment is a computer-readable program that causes the computer device to achieve the completion determination function (f1) to determine whether or not the reading of the predetermined data necessary to display up to the specific part in the web page has been completed after the browser starts reading the web page data to display the entire web page, and the intermediate movement function (f2) to move the position of the browser screen to the specific scroll position that is a position where the specific part is contained in the browser screen in accordance with the determination by the completion determination function that the reading has been completed.

That is, this program corresponds to the program that causes the computer device like the user terminal 4, etc., to execute the process described with reference to FIG. 8, FIG. 10, and FIG. 11, etc.

Such a program may be achieved as a program that is described by source codes like JavaScript contained as a part of the web page data.

6. Modified Examples

The present disclosure is not limited to the specific examples described above, and various modified examples are applicable.

For example, although the description has been given of the questionnaire survey answer page as an example web page for the present disclosure, the present disclosure is broadly and appropriately applicable to information input pages that cause the user to input various information, such as a credit card application page.

Another example information input page is an answer input page for examination questions. An example answer input page for examination questions is a page in the form that contains, for example, questions for a plurality of academic disciplines. When the user gives an operation to specify the academic discipline that the user should give an answer, with the header part of the question part of the subject academic discipline in the answer input page being as the specific part, the display transition is made to such a specific part. The completion determination function and the intermediate movement function are applied to the movement of the browser screen at the time of display transition.

In this case, the web page to which the present disclosure is applicable is not limited to the information input page. For example, the present disclosure is appropriately applicable to web pages which have no premise that the user inputs information, such as web pages that contain contents which are an explanatory leaflet for various products. In the case of, for example, the web page for an explanatory leaflet, the completion determination function and the intermediate movement function are applicable to the movement of the browser screen at the time of display transition to a specific explanatory item among a plurality of listed explanatory items.

Moreover, the present disclosure is also appropriately applicable to web pages that contain games.

REFERENCE SIGNS LIST

1 Network system, 2 Network, 3 Page distributing server, 4 User terminal, 101 CPU, F1 Request receiving process unit, F2 Page data transmitting process unit, P0 to P50 Part, Pp Specific part, PSp Specific scroll position

The invention claimed is:

1. A web page distributing server that receives a transmission request for a web page from a terminal device, and transmits, to the terminal device, web page data to display the entire web page in response to the transmission request, the web page distributing server comprising:
at least one non-transitory memory device operable to store program code; and
at least one processor operable to read said program code and operate as instructed by said program code, said program code comprising:
transmission code configured to cause the at least one processor to control the web page distributing server to transmit, to the terminal device, a program that causes the terminal device to achieve:
a completion determination function to determine whether or not a browser of the terminal device has completed reading of data necessary to display a specific part in the web page prior to reading data necessary to display all of the web page; and
an intermediate movement function to move, prior to reading the data necessary to display all of the web page, a position of a browser screen to a specific scroll position which is a position where the specific part is contained in the browser screen in response to a determination by the completion determination function that the reading has been completed.

2. The web page distributing server according to claim 1, wherein the completion determination function by the program determines whether or not reading of data necessary to display up to the specific part in the web page has been completed after the browser of the terminal device starts reading the web page data.

3. The web page distributing server according to claim 1, wherein the program further causes the terminal device to achieve:
a reading time estimation function to estimate a page reading time which is a time necessary until the reading of the entire web page is completed;
an intermediate movement permission function to permit the movement to the specific scroll position by the intermediate movement function when the page reading time is estimated as being equal to or longer than a predetermined time; and
an intermediate movement prohibition function to prohibit the movement to the specific scroll position by the intermediate movement function when the page reading time is estimated as being less than the predetermined time, and to execute the movement to the specific scroll position after the reading of the entire web page is completed.

4. The web page distributing server according to claim 1, wherein the program further causes the terminal device to achieve an image later reading function to execute a reading of an image after the movement to the specific scroll position by the intermediate movement function when the image is contained in a part located at a page-header side beyond the specific part in the web page.

5. The web page distributing server according to claim 1, wherein:
the web page is an information input page for a user to input information for a plurality of fields; and
the specific part is a display part of a specific field in the information input page.

6. The web page distributing server according to claim 5, wherein the specific field is a field specified by the terminal device based on information input details in the information input page that is different from the information input page that contains the specific field.

7. The web page distributing server according to claim 1, wherein the transmission request contains a display request for the specific part in the web page.

8. The web page distributing server according to claim 1, wherein the program further causes the terminal device to achieve a preferential reading function to read, from the web page distributing server, a part of the web page data corresponding to the position that contains the specific part of the web page in preference to other part of the web page data.

9. A web page distributing method for causing a web page distributing server to receive a transmission request for a web page from a terminal device, and for causing the web page distributing server to transmit, to the terminal device, web page data to display the entire web page in response to the transmission request, the web page distributing method comprising:
transmitting a program that causes the terminal device to achieve:
a completion determination function to determine whether or not a browser of the terminal device has completed reading of data necessary to display a specific part in the web page prior to reading data necessary to display all of the web page; and
an intermediate movement function to move a position of a browser screen to a specific scroll position which is a position where the specific part is contained in the browser screen in response to a determination by the completion determination function that the reading has been completed prior to reading data necessary to display all of the web page.

10. The web page distributing method according to claim 9, wherein the completion determination function by the program determines whether or not reading of data necessary to display the position up to the specific part in the web page has been completed after the browser of the terminal device starts reading the web page data.

11. The web page distributing method according to claim 9, wherein the program further causes the terminal device to achieve a preferential reading function to read, from the web page distributing server, a part of the web page data corresponding to the position that contains the specific part of the web page in preference to other part of the web page data.

12. A non-transitory computer readable tangible information storage medium statically storing the program code for the web page distributing server according to claim 1.

13. A non-transitory computer readable tangible information storage medium statically storing the program code for the web page distributing server according to claim 2.

14. A non-transitory computer readable tangible information storage medium statically storing the program code for the web page distributing server according to claim 8.

15. The web page distributing server according to claim 1, wherein the intermediate movement function is further configured to move the position of the browser screen to the specific scroll position in response to a page reading time exceeding being equal to or longer than a predetermined time and the data necessary to display the specific part having been read, and wherein the page reading time indicates a time necessary until the reading of the entire web page is completed.

* * * * *